(12) United States Patent
Hankins et al.

(10) Patent No.: US 6,592,266 B1
(45) Date of Patent: Jul. 15, 2003

(54) FIBER OPTIC CABLE CONNECTOR CLIP

(75) Inventors: Christopher Hankins, Santa Rosa, CA (US); Michael Arnstein, Rohnert Park, CA (US)

(73) Assignee: Advanced Fibre Communications, Inc., Petaluma, CA (US)

( * ) Notice: Subject to any disclaimer, the term of this patent is extended or adjusted under 35 U.S.C. 154(b) by 28 days.

(21) Appl. No.: 09/971,860

(22) Filed: Oct. 4, 2001

(51) Int. Cl.[7] .................................................. G02B 6/36
(52) U.S. Cl. ............................... 385/53; 385/55; 385/58; 385/134; 385/137
(58) Field of Search ......................... 385/134–137, 385/147, 53, 55, 58, 56, 59

(56) References Cited

U.S. PATENT DOCUMENTS

| | | | |
|---|---|---|---|
| 4,969,924 A | | 11/1990 | Suverison et al. |
| 4,993,803 A | | 2/1991 | Suverison et al. |
| 5,048,916 A | | 9/1991 | Caron |
| 5,071,219 A | | 12/1991 | Yurtin et al. |
| 5,398,295 A | * | 3/1995 | Chang et al. ................. 385/58 |
| 5,999,683 A | * | 12/1999 | Gustafsson ................. 385/136 |
| 6,158,899 A | * | 12/2000 | Arp et al. ...................... 385/53 |
| 6,361,218 B1 | * | 3/2002 | Matasek et al. .............. 385/60 |

* cited by examiner

Primary Examiner—John Juba, Jr.
Assistant Examiner—Fayez Azzaf
(74) Attorney, Agent, or Firm—Pillsbury Winthrop LLP

(57) ABSTRACT

A number of fiber optic connectors are held by a connector clip that positions the fiber optic connectors so that the connectors can only be inserted into a corresponding number of receiving connectors in one way. In addition, the connector clip can only be assembled in one way to prevent the connectors from being improperly positioned within the connector clip.

20 Claims, 4 Drawing Sheets

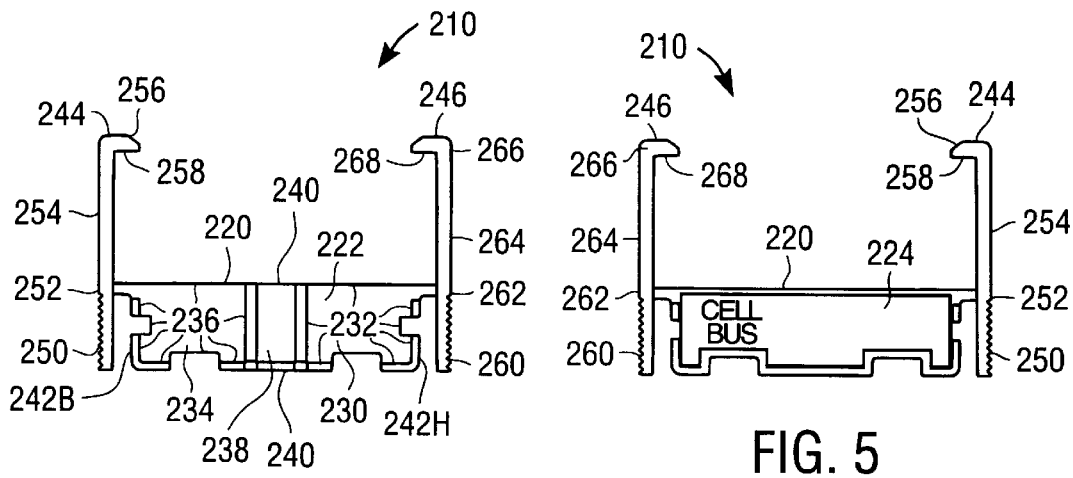
FIG. 4
FIG. 5
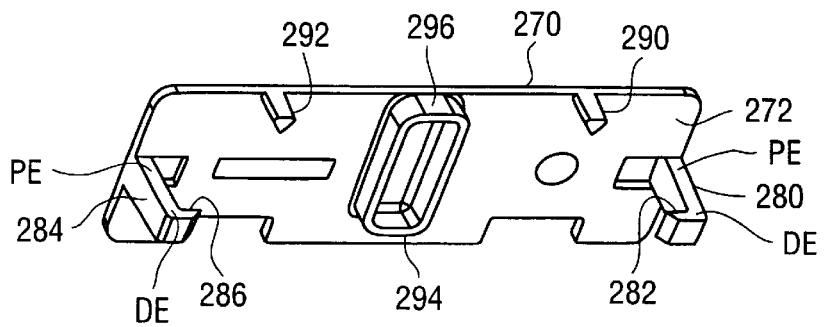
FIG. 6
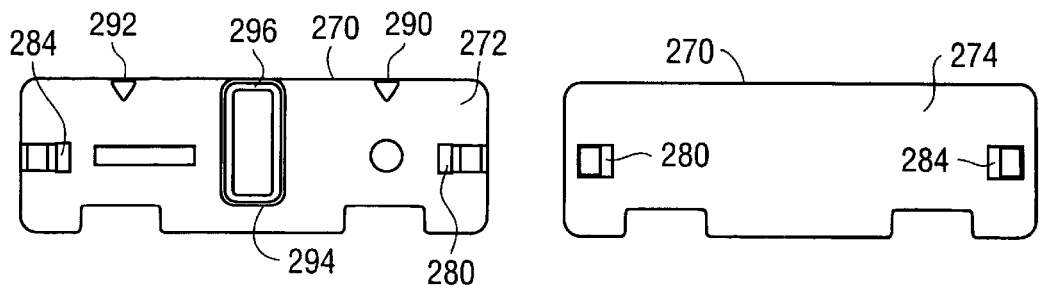
FIG. 7
FIG. 8

FIBER OPTIC CABLE CONNECTOR CLIP

BACKGROUND OF THE INVENTION

1. Field of the Invention

The present invention relates to fibre optic connectors and, more particularly, to a fibre optic cable connector clip that houses a number of fibre optic connectors.

2. Description of the Related Art

Fibre optic connection systems are used to easily connect a fibre optic cable to another cable or to an optical or electro-optical device. Fibre optic connection systems typically have two pieces: a male connector and a female connector. The female connector, in turn, is formed to receive and hold the male connector.

FIG. 1A is a top side perspective view illustrating a prior-art, male fibre optic connector 100. FIG. 1B is a bottom side perspective view illustrating fibre optic connector 100. As shown in FIGS. 1A–1B, connector 100 has a ribbed body 110 that includes a top surface 112 and a bottom surface 114.

Ribbed body 110 also includes a top side projection 116 that extends above top surface 112, and a cavity 118 that is formed in bottom surface 114. Top surface 112 and projection 116, in turn, form a lower surface of cavity 118 (as viewed in FIG. 1B). In addition, ribbed body 110 includes an opening (not shown) that receives two fibre optic cables 120, and two output ports 122 which are internally connected to receive the light signals from the two fibre optic cables 120.

When multiple connections are required, it is a common practice to use the same style of male and female connectors for each connection in an effort to reduce costs. For example, when a device, such as a printed circuit board, requires a number of connections, the same female connectors can be used on the printed circuit board, while the same male connectors can be used with the cables. This cost savings effort, however, can lead to installation confusion if a technician can not easily determine which male connector of a cable goes to which female connector on the printed circuit board.

One approach to solving this problem is to color code the male and female connectors. Another similar approach is to tag the male and female connectors. Although these approaches are workable, coding or tagging the connectors quickly erodes any cost savings that can be obtained by using the same connectors due to increased production costs.

For example, when using coded connectors, both the manufacturer of the printed circuit board and the manufacturer of the cables (with connectors) have to insure that the correct colored connector is used. Not only is the coordination difficult, but costly rework can be required if the wrong colored connector is used.

Thus, there is a need for a technique to quickly and correctly connect a number of identical male connectors to a corresponding number of female connectors that allows the same male connectors to be used without coding or tagging.

SUMMARY OF THE INVENTION

The present invention provides a connector clip that holds a number of identical connectors so that the connectors can only be inserted into a corresponding number of receiving connectors in one way. In addition, the connector clip can only be assembled in one way to prevent the connectors from being improperly positioned within the connector clip.

A connector clip in accordance with the present invention includes a clip base that has a base member. The base member, in turn, has a base interior surface and a base exterior surface. The base interior surface has a first surface region bounded by a plurality of first line segments and a second surface region bounded by a plurality of second line segments.

The clip base also has a plurality of side walls that are connected to the base member to extend away from the interior base surface. In addition, the side walls contact a number of the first line segments and a number of the second line segments. The clip base further has a first retaining member that is flexibly connected to the base member, and a second retaining member that is flexibly connected to the base member.

In addition to the base member, the connector clip also includes a clip top that has a top member. The top member, in turn, has a top interior surface and a top exterior surface. The clip top also has a first holding member that is connected to the top member to extend away from the top interior surface. In addition, the first holding member also contacts the base exterior surface.

The clip top further has a second holding member that is connected to the top member to extend away from the top interior surface. In addition, the second holding member contacts the base exterior surface. Further, the clip top includes a first pin that is connected to the top member to extend away from the top interior surface, and a second pin that is connected to the top member to extend away from the top interior surface.

A better understanding of the features and advantages of the present invention will be obtained by reference to the following detailed description and accompanying drawings that set forth an illustrative embodiment in which the principles of the invention are utilized.

BRIEF DESCRIPTION OF THE DRAWINGS

FIG. 4 is an interior plan view illustrating clip base 210 in accordance with the present invention.

FIG. 5 is an exterior plan view illustrating clip base 210 in accordance with the present invention.

FIG. 6 is a perspective view illustrating clip top 212 in accordance with the present invention.

FIG. 7 is an interior plan view illustrating clip top 212 in accordance with the present invention.

FIG. 8 is an exterior plan view illustrating clip top 212 in accordance with the present invention.

DETAILED DESCRIPTION

Figure 2:
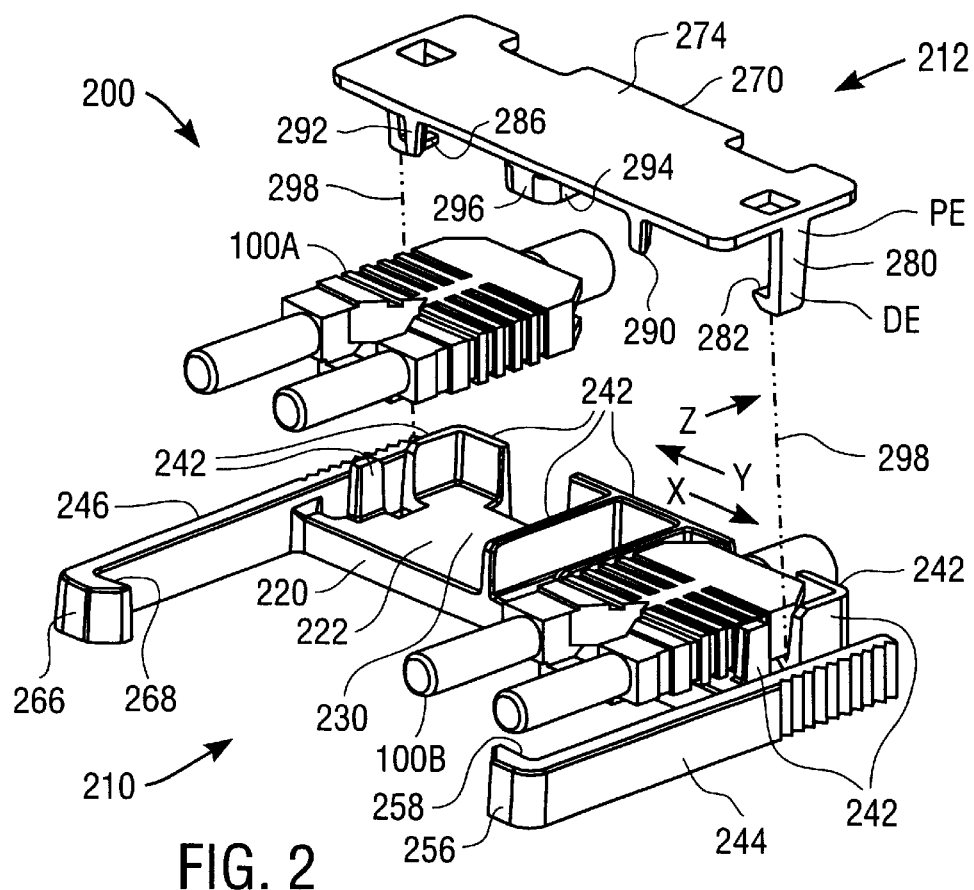
FIG. 2 is a perspective view illustrating a fibre optic connector clip 200 in accordance with the present invention.

FIG. 2 shows a perspective view that illustrates a fibre optic connector clip 200 in accordance with the present invention. As described in greater detail below, the connector clip of the present invention prevents a pair of side-by-side fibre optic connectors from being improperly connected to a receiving pair of connectors that are attached to a printed circuit board.

Figure 3:
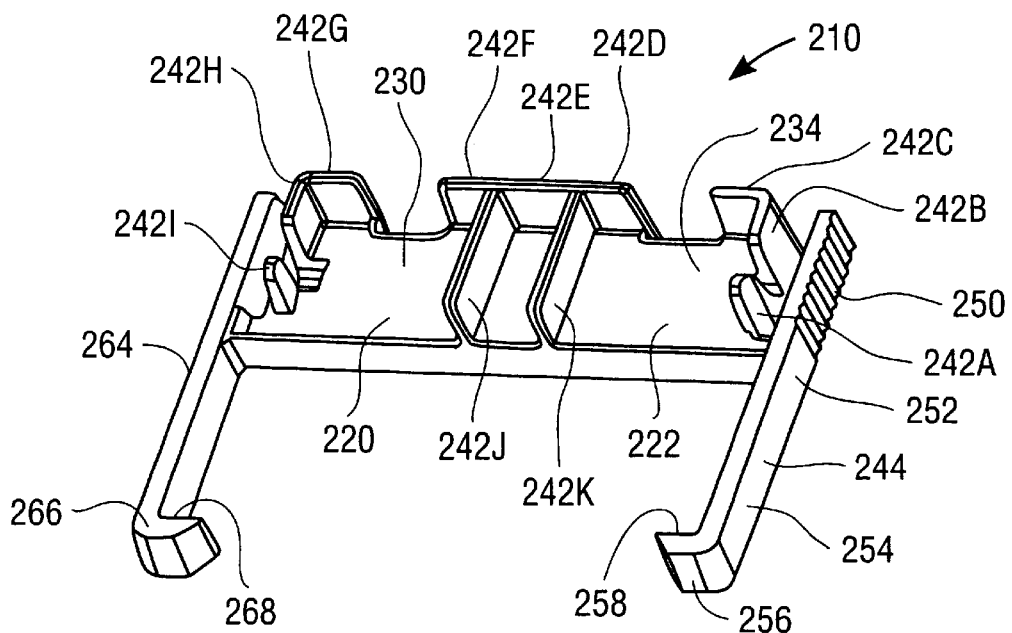
FIG. 3 is a perspective view illustrating clip base 210 in accordance with the present invention.

As shown in FIG. 2, clip 200 includes a clip base 210 and a clip top 212. FIG. 3 shows a perspective view of clip base 210 in accordance with the present invention. FIG. 4 shows an interior plan view of clip base 210 in accordance with the present invention. FIG. 5 shows an exterior plan view of clip base 210 in accordance with the present invention.

As shown in FIGS. 2–5, clip base 210 includes a base member 220 that has a base interior surface 222 and a base exterior surface 224 on the opposite side of base member 220. Base interior surface 222, in turn, has a first surface region 230 that is bounded by a plurality of first line segments 232, and a second surface region 234 that is bounded by a plurality of second line segments 236.

In addition, base interior surface 222 further includes a third surface region 238 that is bounded by a first line segment 232, a second line segment 236, and two third line segments 240 that are connected to the first and second line segments 232 and 236. As a result, third surface region 238 lies between the first and second surface regions 230 and 234.

As further shown in FIGS. 2–5, clip base 210 also includes a plurality of side walls 242, including side walls 242A–242K, that are connected to base member 220 to extend away from base interior surface 222. In addition, side walls 242 contact a number of the first line segments 232 and a number of the second line segments 236. Further, side wall 242E is connected to base member 220 to contact a third line segment 240 and extend away from base interior surface 222. In the example shown in FIGS. 2–5, the side walls 242 have substantially uniform thicknesses.

Clip base 210 further includes a first retaining member 244 that is flexibly connected to base member 220, and a second retaining member 246 that is flexibly connected to base member 220. First retaining member 244 includes a compression section 250, a pivot section 252 that is connected to base member 220 and section 250, and a holding section 254 that is connected to pivot section 252.

Compression section 250, in turn, is spaced apart from and substantially parallel with side walls 242A and 242B, which are connected to second line segments 236 at one end of base member 220. First retaining member 244 also includes a first retaining tab 256 with a surface 258 that is, for example, normal to a length of holding section 254.

Similarly, second retaining member 246 includes a compression section 260, a pivot section 262 that is connected to base member 220 and section 260, and a holding section 264 that is connected to pivot section 262. In addition, compression section 260 is spaced apart from and substantially parallel with side walls 242H and 242I, which are connected to the first line segments 232 at the other end of base member 220. Second retaining member 246 also includes a second retaining tab 266 with a surface 268 that is, for example, normal to a length of holding section 264.

In the example shown in FIGS. 2–5, base member 220 lies within a single plane. Base member 220 can alternately include projections that lie outside of the plane to allow retaining members 244 and 246 to be raised or lowered with respect to the base interior surface 222.

As noted above, in addition to clip base 210, clip 200 also includes clip top 212. FIG. 6 shows a perspective view of clip top 212 in accordance with the present invention. FIG. 7 shows an interior plan view of clip top 212 in accordance with the present invention. FIG. 8 shows an exterior plan view of clip top 212 in accordance with the present invention.

As shown in FIGS. 2 and 6–8, clip top 212 includes a top member 270 that has a top interior surface 272 and a top exterior surface 274 on the opposite side of top member 270. In the example shown in FIG. 2, top member 270 lies within a single plane that, when connected to clip base 210, is substantially parallel with the plane of base member 220. Top member 270 can alternately include projections that lie outside of the plane to allow retaining members 244 and 246 to be connected to top member 270 in lieu of base member 220.

As shown in FIGS. 2 and 6–8, clip top 212 additionally includes a first holding member 280 that is connected to top member 270 to extend away from top interior surface 272. First holding member 280 also has a surface 282 that is, for example, normal to the length of holding member 280. In addition, first holding member 280 has a proximate end PE and a distal end DE that is deformable with respect to the proximate end PE.

Similarly, clip top 212 additionally includes a second holding member 284 that is connected to top member 270 to extend away from top interior surface 272. Second holding member 284 also has a surface 286 that is, for example, normal to the length of holding member 284. In addition, second holding member 284 has a proximate end PE and a distal end DE that is deformable with respect to the proximate end PE of second holding member 284.

Clip top 212 further includes a first pin 290 that is connected to top member 270 to extend away from top interior surface 272, and a second pin 292 that is connected to top member 270 to extend away from top interior surface 272. In the example shown in FIG. 2, when clip top 212 is connected to clip base 210, first pin 290 lies over a second line segment 236 that has no side wall 242 connected to it, while second pin 292 lies over a first line segment 232 that has no side wall 242 connected to it.

In addition, clip top 212 includes a stabilizer projection 294 that extends away from top interior surface 272 and lies over third surface region 238. In addition, stabilizer projection 294 is adjacent to side wall 242J that is connected to a first line segment 232 and side wall 242K that is connected to a second line segment 236.

Further, clip top 212 includes a wrong way projection 296 that is connected to top member 270 to extend away from top interior surface 272. Wrong way projection 296 contacts side wall 242E to prevent clip top 212 from being improperly connected to base clip 210.

Figure 1A:
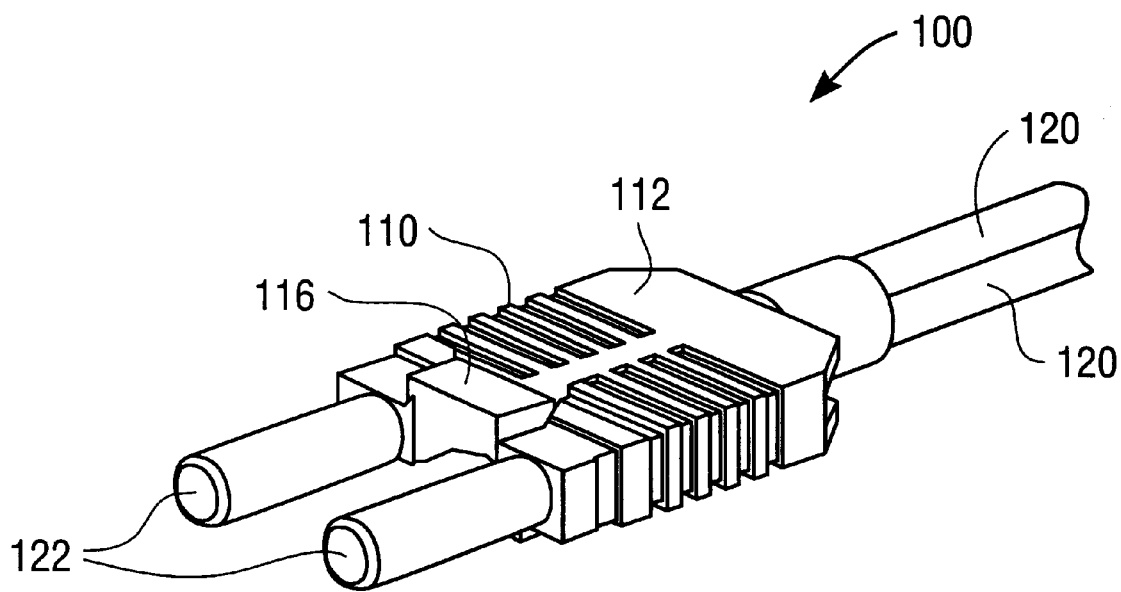
FIG. 1A is a top side perspective view illustrating a prior-art fibre optic connector 100.
Figure 1B:
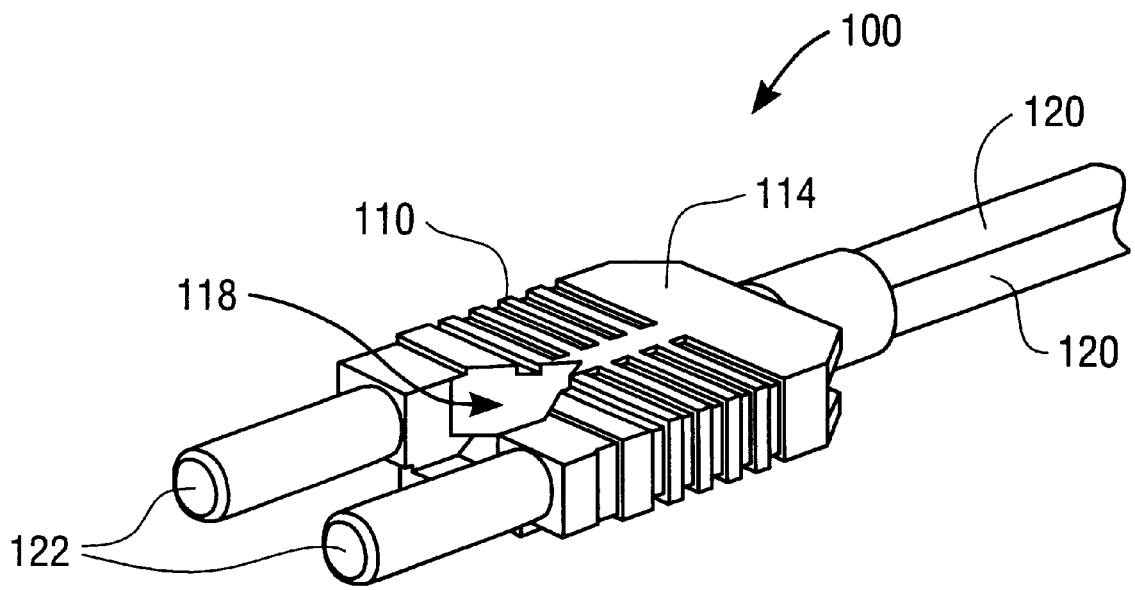
FIG. 1B is a bottom side perspective view illustrating prior-art fibre optic connector 100.

In operation, as shown in FIG. 2, a connector 100A is placed on surface 230 of clip base 210, while a connector 100B is placed on surface 234 of clip base 210. Connectors 100A and 100B are identical to connector 100 of FIG. 1 and, although not shown, are connected to fibre optic cables.

Following this, clip top 212 is clipped to clip base 210 as shown by exploded lines 298 in FIG. 2 by momentarily deforming the distal ends DE of holding members 280 and 284. When clip base 210 and clip top 212 are clipped together, first holding member 280 is positioned between side walls 242A and 242B, and surface 282 of first holding member 280 is adjacent to or contacts base exterior surface 224. Similarly, second holding member 284 is positioned between side walls 242H and 242I, and surface 286 of second holding member 284 is adjacent to or contacts base exterior surface 224.

Further, side walls 242F and 242G limit movement in a Z direction (see FIG. 2) of connector 100A, while side walls 242C and 242D limit movement in the Z direction of connector 100B. Movement of connector 100A in the direction opposite to the Z direction is limited by pin 292, which extends into cavity 118 (see FIG. 1B) of connector 100A.

Similarly, movement of connector 100B in the direction opposite to the Z direction is limited by pin 290, which extends into cavity 118 of connector 100B.

In addition, projection 294 is adjacent to or contacts side walls 242E, 242J, and 242K. Thus, in response to a lateral force in three of the four directions, shown as arrows X, Y, and Z in FIG. 2, projection 294 protects holding members 280 and 284 from the force in these three directions. Further, clip base 210 is integrally formed, and clip top 212 is integrally formed using, for example, conventional injection-molding processes.

Figure 9:
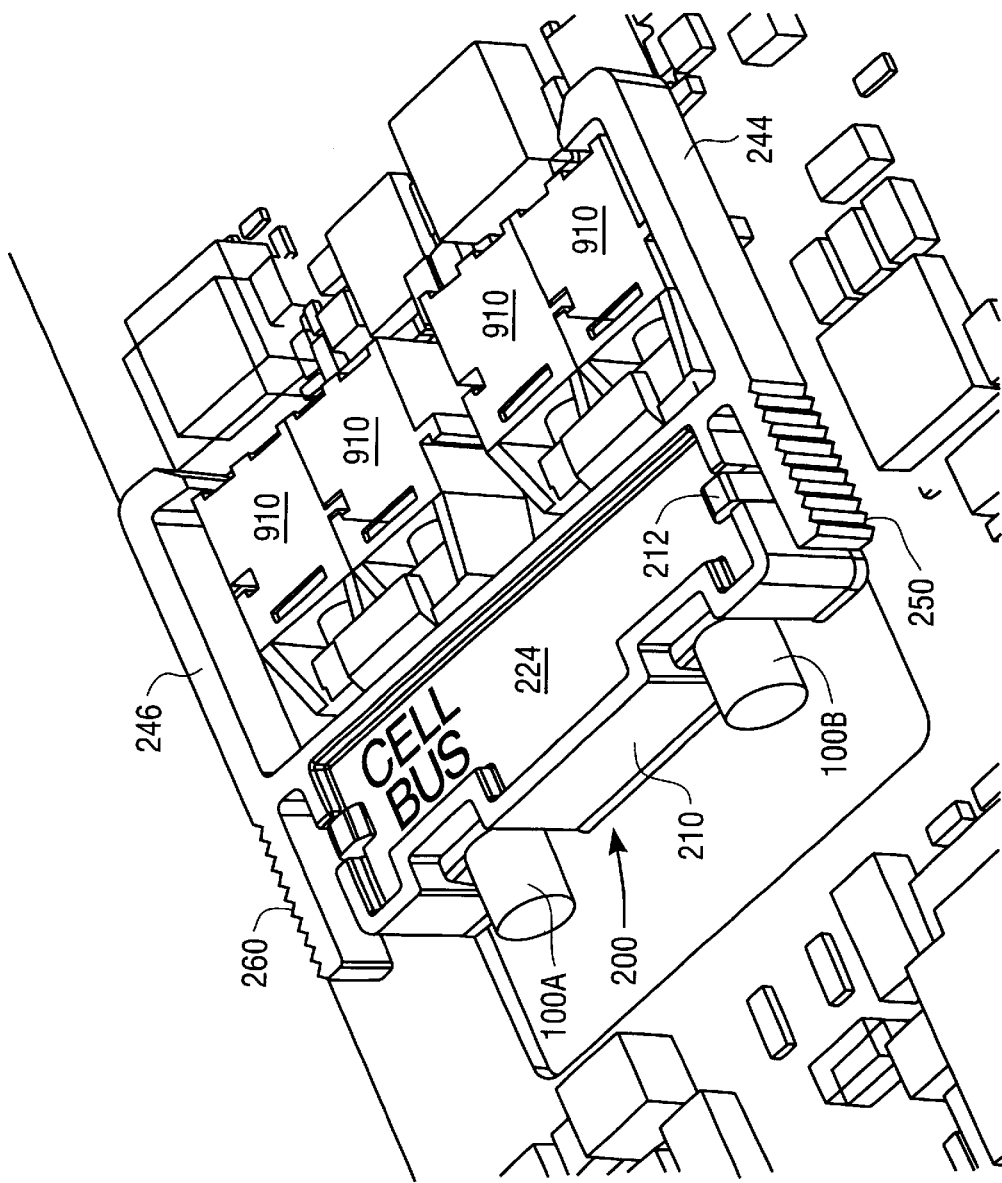
FIG. 9 is a perspective drawing illustrating connector clip 200 in accordance with the present invention.

FIG. 9 shows a perspective drawing that illustrates connector clip 200 in accordance with the present invention. As shown in FIG. 9, clip base 210 and clip top 212 are connected together to form connector clip 200, while connector clip 200 is connected to four receiving connectors 910 via retaining members 244 and 246.

One of the advantages of the present invention is that, in addition to limiting movement in the direction opposite to the Z direction, pins 290 and 292 also prevent the incorrect placement of connectors 100A and 100B within clip 200. This is because a connector 100 can only be placed with clip 200 in one way and still allow a pin (290 or 292) to fit within cavity 118 of the connector 100.

Another advantage of the present invention is that connector clip 200 can only be inserted into receiving connectors 910 in one way. If connector clip 200 is turned over (so that the phrase "cell bus" is adjacent to the surface of the printed circuit board and can not be seen), ports 122 can not be connected to connectors 910.

Thus, since connectors 100A and 100B can only be positioned within clip 200 in one way, and clip 200 can only be connected to receiving connectors 910 in one way, fibre optic connector clip 200 defines a positional relationship between connectors 100A and 100B held by clip 200. As a result, connector clip 200 prevents the pair of side-by-side fibre optic connectors 100A and 100B from being improperly connected to the receiving pair of connectors 910 that are attached to a printed circuit board.

A further advantage of the present invention is that connector clip 200 prevents an improper connection to the receiving connectors without impacting the production of the printed circuit boards or the production of the cables (with connectors 100 attached). Some production time is required to place connectors 100A and 100B within connector clip 200 and assemble connector clip 200. However, due to the design of the present invention, this assembly time is minimal.

An additional advantage of the present invention is that errors in the assembly of connector clip 200 that occur by switching the placement of connectors 100A and 100B can be easily fixed. Only three steps are required to fix an assembly error: unclipping top 212 from base 210 rearranging connectors 100A and 100B, and then reclipping top 212 to base 210. Thus, the present invention also reduces the cost of rework.

It should be understood that various alternatives to the method of the invention described herein may be employed in practicing the invention. Thus, it is intended that the following claims define the scope of the invention and that methods and structures within the scope of these claims and their equivalents be covered thereby.

What is claimed is:

1. A fibre optic connector clip comprising:
    a clip base having:
        a base member having a base interior surface and a base exterior surface, the base interior surface having a first surface region bounded by a plurality of first line segments and a second surface region bounded by a plurality of second line segments;
        a plurality of side walls connected to the base member to extend away from the interior base surface, the side walls contacting a number of the first line segments and a number of the second line segments;
        a first retaining member flexibly connected to the base member; and
        a second retaining member flexibly connected to the base member; and
    a clip top having:
        a top member having a top interior surface and a top exterior surface;
        a first holding member connected to the top member to extend away from the top interior surface, the first holding member contacting the base exterior surface;
        a second holding member connected to the top member to extend away from the top interior surface, the second holding member contacting the base exterior surface;
        a first pin connected to the top member to extend away from the top interior surface; and
        a second pin connected to the top member to extend away from the top interior surface.

2. The connector of claim 1 wherein at least two first line segments are connected to side walls, and at least two second line segments are connected to side walls.

3. The connector of claim 2 wherein three first line segments are connected to side walls, and three second line segments are connected to side walls.

4. The connector of claim 2 wherein the base member lies substantially in a single plane, the top member lies substantially in a single plane substantially parallel to the single plane having the base member.

5. The connector of claim 4 wherein:
    the first retaining member includes a compression section that is spaced apart from and substantially parallel with a side wall connected to a first line segment, a pivot section connected to the base member, and a holding section connected to the pivot section, and
    the second retaining member includes a compression section that is spaced apart from and substantially parallel with a side wall connected to a second line segment, a pivot section connected to the base member, and a holding section connected to the pivot section of the second retaining member.

6. The connector of claim 5 wherein the first retaining member has a first retaining tab normal to a length of the holding section of the first retaining member, and the second retaining member has a second retaining tab normal to a length of the holding section of the second retaining member.

7. The connector of claim 2 wherein the side walls have substantially uniform thicknesses.

8. The connector of claim 7 wherein:
    the first retaining member includes a compression section that is spaced apart from and substantially parallel with a side wall connected to a first line segment, a pivot section connected to the base member, and a holding section connected to the pivot section, and
    the second retaining member includes a compression section that is spaced apart from and substantially parallel with a side wall connected to a second line segment, a pivot section connected to the base member, and a holding section connected to the pivot section of the second retaining member.

9. The connector of claim 1 wherein:

the base interior surface further includes a third surface region bounded by a first line segment, a second line segment, and two third line segments connected to the first and second line segments so that the third surface region lies between the first and second surface regions; and the clip top further includes a stabilizer projection that extends away from the top interior surface and lies over the third surface region adjacent to a side wall connected to a first line segment and a side wall connected to a second line segment.

10. The connector of claim 9 wherein a side wall is connected to the base member to contact a third line segment and extend away from the base interior surface.

11. The connector of claim 10 wherein the clip top further includes a wrong way projection connected to the top member that extends away from the top interior surface, the wrong way projection contacting a side wall to prevent the clip top from being improperly connected to the base member.

12. The connector of claim 11 wherein at least two first line segments are connected to side walls, and at least two second line segments are connected to side walls.

13. The connector of claim 12 wherein three first line segments are connected to side walls, and three second line segments are connected to side walls.

14. The connector of claim 1 wherein the first holding member has a proximate end and a distal end that is deformable with respect to the proximate end, and the second holding member has a proximate end and a distal end that is deformable with respect to the proximate end of the second holding member.

15. The connector of claim 14 wherein the first pin lies over a first line segment to form a first covered segment and the second pin lies over a second line segment to form a second covered segment.

16. The connector of claim 15 wherein no side walls are connected to the first covered segment, and no side walls are connected to the second line segment.

17. The connector of claim 16 wherein at least two first line segments are connected to side walls, and at least two second line segments are connected to side walls.

18. The connector of claim 1 wherein the first pin lies over a first line segment to form a first covered segment and the second pin lies over a second line segment to form a second covered segment.

19. The connector of claim 18 wherein no side walls are connected to the first covered segment, and no side walls are connected to the second line segment.

20. The connector of claim 19 wherein at least two first line segments are connected to side walls, and at least two second line segments are connected to side walls.

* * * * *